US006811875B2

(12) United States Patent
Kikuchi et al.

(10) Patent No.: US 6,811,875 B2
(45) Date of Patent: Nov. 2, 2004

(54) PARTIAL DISCHARGING-RESISTANT WIRE ENAMEL COMPOSITION AND PARTIAL DISCHARGING-RESISTANT MAGNET WIRE

(75) Inventors: Hideyuki Kikuchi, Ibaraki (JP); Yoshiyuki Tetsu, Ibaraki (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 09/784,343

(22) Filed: Feb. 16, 2001

(65) Prior Publication Data

US 2003/0232144 A1 Dec. 18, 2003

(30) Foreign Application Priority Data

Feb. 16, 2000 (JP) ........................................ 2000-043566
Nov. 15, 2000 (JP) ........................................ 2000-352559

(51) Int. Cl.[7] .............................. B32B 9/00; H01B 3/10

(52) U.S. Cl. ........................ 428/372; 428/375; 428/379; 428/380; 428/383; 428/384; 428/387; 428/389; 428/640; 428/641; 428/629; 428/632; 428/689; 428/702; 174/110 A; 174/110 SR; 174/118; 174/119 C; 174/127; 174/110 R

(58) Field of Search ................................ 428/372, 375, 428/379, 380, 383, 384, 387, 389, 640, 641, 629, 632, 689, 702; 174/110 A, 110 SR, 118, 119 C, 127, 110 R

(56) References Cited

U.S. PATENT DOCUMENTS

| | | | | |
|---|---|---|---|---|
| 4,537,804 A | | 8/1985 | Keane et al. | 427/118 |
| 4,760,296 A | * | 7/1988 | Johnston et al. | 310/45 |
| 5,654,095 A | | 8/1997 | Yin et al. | 428/372 |
| 5,861,578 A | | 1/1999 | Hake et al. | 174/120 |

* cited by examiner

*Primary Examiner*—Deborah Jones
*Assistant Examiner*—Ling Xu
(74) *Attorney, Agent, or Firm*—Antonelli, Terry, Stout & Kraus, LLP

(57) ABSTRACT

The prevent invention provides a partial discharge-resistant wire enamel composition wherein at least one fine particle sol selected from the group of metal oxide fine particle sol and silicon oxide fine particle sol is dispersed, and 3 to 100 parts by weight of at least one fine particle selected from the group of a metal oxide fine particle and a silicon oxide fine particle is contained per 100 parts by weight of wire enamel resin. Accordingly, the partial discharge-resistant wire enamel composition having excellent dispersibility of inorganic fine particle can be obtained.

17 Claims, 1 Drawing Sheet

PARTIAL DISCHARGING-RESISTANT WIRE ENAMEL COMPOSITION AND PARTIAL DISCHARGING-RESISTANT MAGNET WIRE

BACKGROUND OF THE INVENTION

1. Field of the Invention

The present invention relate to a partial discharging-resistant wire enamel composition and a partial discharging-resistant magnet wire.

2. Description of the Related Art

A mechanism of partial discharging deterioration of electrically insulation materials is hypothesized that charged particles generated by partial discharge collide with an insulation material, the collision causes cutting off of a polymer chain of the insulation material, and thermal decomposition due to sputtering and local temperature rise, further, ozone generated by the partial discharge causes chemical deterioration and the like of the insulation material, and progress of these deteriorations leads finally to insulation breakdown of an electric machinery coil.

Partial discharge deterioration in an inverter control apparatus which recently become to be used widely is presumed to be caused by a phenomenon in which a high voltage surge is superimposed as a switch pulse, leading to deterioration of a coil of an inverter control apparatus.

Contrary to this, partial discharge deterioration in an generally used high voltage transformer treated with mold insulation or interlayer insulation is caused by minute cavity generated in an insulation layer.

As the insulation material which is not easily deteriorated by partial discharge, inorganic insulation materials, such as metal oxides, nitrides, glass, mica and the like are known.

Further, as the magnet wire having excellent partial discharge deterioration-resistance, those produced by coating wire enamel composition prepared by dispersing an inorganic insulation material fine powder, such as silica, alumina, titanium oxide and the like are known.

In such a partial discharge-resistant magnet wire, the lager the containing amount of inorganic insulation material fine powder in an insulation coating, the greater the improvement of partial discharge deterioration-resistance.

However, in a magnet wire containing a large amount of an inorganic insulation material fine powder in an insulation coating, flexibility, softening property, winding property, extensibility and the like deteriorate. If an electric machinery coil is formed by a magnet wire having deteriorated flexibility, softening property, winding property, extensibility and the like, many cracks will be formed in a coating of the magnet wire. Consequently, an effect of improving partial discharge deterioration-resistance can not be exerted.

An inorganic insulation material-dispersed magnet wire having a multi-layer structure is used for satisfying both improvement in partial discharge deterioration-resistance and improvement in flexibility, softening property, winding property, extensibility and the like.

FIGS. 1 and 2 show a cross sectional view of such an inorganic insulation material-dispersed magnet wire having a multi-layer structure. In FIGS. 1 and 2, 1 represents a conductor, 2 represents a polyamideimide under coating layer, 3 represents an inorganic insulation material-dispersed wire enamel composition coating layer, and 4 represents a polyamideimide over coating layer.

An inorganic insulation material-dispersed magnet wire having a multi-layer structure as shown in FIG. 1 is comprising a conductor 1, an inorganic insulation material-dispersed wire enamel composition coating layer 3 provided on a conductor 1, and a polyamideimide over coating layer 4 provided on the inorganic insulation material-dispersed wire enamel composition coating layer 3.

An inorganic insulation material-dispersed magnet wire having a multi-layer structure as shown in FIG. 2 is comprising a conductor 1, a polyamideimide under coating layer 2 provided on a conductor 1, an inorganic insulation material-dispersed wire enamel composition coating layer 3 provided on the polyamideimide under coating layer 2, and a polyamideimide over coating layer 4 provided on the inorganic insulation material-dispersed wire enamel composition coating layer 3.

However, in the above-described magnet wire as shown in FIG. 1 and FIG. 2, a large amount of inorganic insulation material is dispersed in the inorganic insulation material-dispersed wire enamel composition coating layer 3, consequently, flexibility, softening property, winding property, extensibility and the like are inevitably inferior to those of a general enameled wire. For example, if these magnet wires are wound after 10% extension, cracks are formed on the inorganic insulation material-dispersed wire enamel composition coating layer 3.

Further, in a wire enamel composition in which a large amount of an inorganic insulation material has thus been dispersed, as a result of precipitation or whitening of the inorganic insulation material, there appears a fear of deterioration in surface smoothness of a magnet wire, or decrease in electric insulation-resistance and mechanical properties.

SUMMARY OF THE INVENTION

The present invention has been made based on the above-mentioned problems, and an object thereof is to solve the above-mentioned prior art problems and to provide a partial discharge-resistant wire enamel composition having excellent dispersibility of an inorganic insulation material and a partial discharge-resistant magnet wire having both flexibility and partial discharge deterioration-resistance.

A partial discharge-resistant wire enamel composition of the present invention is a wire enamel composition wherein at least one fine particle sol selected from the group of metal oxide fine particle sol and silicon oxide fine particle sol is dispersed, said wire enamel composition comprising 100 parts by weight of wire enamel resin and 3 to 100 part by weight of at least one fine particle selected from the group of a metal oxide fine particle and a silicon oxide fine particle.

Further, a partial discharge-resistant magnet wire of the present invention is a magnet wire obtained by coating and baking directly or through other coating layer on a conductor a partial discharge-resistant wire enamel composition wherein at least one fine particle sol selected from the group of metal oxide fine particle sol and silicon oxide fine particle sol is dispersed, said wire enamel composition comprising 100 parts by weight of wire enamel resin and 3 to 100 parts by weight of at least one fine particle selected from the group of a metal oxide fine particle and a silicon oxide fine particle.

In the present invention, the content of fine particle selected form the group of a metal oxide fine particle and a silicon oxide fine particle is from 3 to 100 parts by weight per 100 parts by weight of wire enamel resin content of a wire enamel composition. If the content is less than 3 parts by weight, an effect of improving partial discharge deterioration will be insufficient, and if over 100 parts by weight, flexibility and extension-resistance will be deteriorate.

The future of the present invention is that a transparent or opalescent colloid (this colloid is referred to as sol) comprising dispersing medium having excellent compatibility with a wire enamel composition and at least one fine particle selected from the group of a metal oxide fine particular and a silicon oxide tin particle dispersed therein, is dispersed in a wire enamel composition to accomplish a uniform dispersion of a fine particle. In this case, use of a metal oxide fine particle or a silicon oxide fine particle having an average particle size of 100 nm ($100\times10^{-6}$ mm) or less is preferable for realizing smoothness or flexibility of the wire enamel composition coating layer.

In the magnet wire of the present invention, a coating layer composed of a wire enamel composition in which at least one fine particle sol selected from the group of metal oxide fine particle sol and silicon oxide fine particle sol is dispersed may be formed as the outermost layer. Another aspect of the magnet wire of this invention is lubricant coating layer which import excellent sliding property to a magnet wire may be formed around the coating layer composed of a wire enamel composition of this invention.

DESCRIPTION OF THE PREFERRED EMOBDIMENTS

Figure 1:
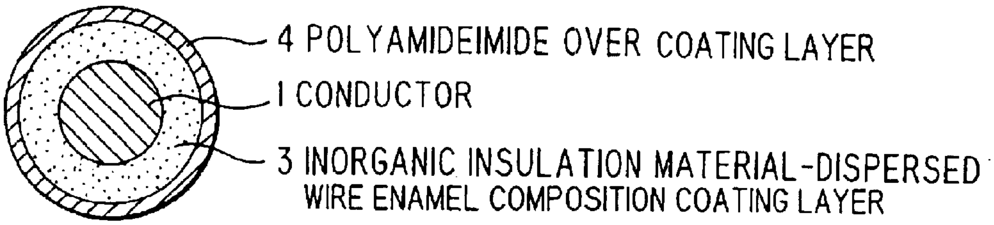
FIG 1 PRIOR ART
FIG. 1 is a sectional view of a conventional polyamideimide-overcoated inorganic insulation-material-dispersed magnet wire.
Figure 2:
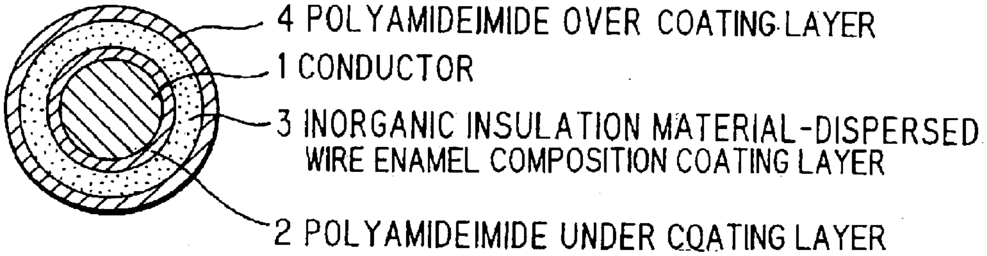
FIG. 2 PRIOR ART
FIG. 2 is a sectional view of a conventional polyamideimide-undercoated and polyamideimide-overcoated inorganic insulation material-dispersed magnet wire.

Examples of a partial discharge-resistant wire enamel composition and a partial discharge-resistant magnet wire of the present invention will be illustrated.

In the present invention, a copper wire, aluminum wire, nickel wire and the like may be used as the conductor.

The base wire enamel material of the present invention can be of all industrially available wire enamel composition including, for example, a formal wire enamel composition, polyester wire enamel composition, polyesterimide wire enamel composition, polyamideimide wire enamel composition, polyimide wire enamel composition and the like.

The metal oxide fine particle sol preferably used in present invention is one having excellent dispersibility in a wire enamel composition and having property to improve partial discharge-resistance, including, for example, alumina fine particle sol, zirconia fine particle sol, titania fine particle sol, yttria fine particle and the like. The silicon oxide fine particle sol, preferably used in this invention is, for example, silica fine particle sol. Further, these sols may be solvent-substituted.

The dispersing medium for the metal oxide fine particle sol or silicon oxide fine particle sol preferably used in present invention is one having excellent solubility with a wire enamel composition, for example, water, methanol, dimethylacetamide, methyl ethyl isobutyl ketone, xylene/butanol mixed solvent, and the like.

Additionally, if a general metal oxide or silicon oxide is dispersed in fine particle condition into a wire enamel composition, partial discharge deterioration-resistance of an enameled wire will not be improved unless a metal oxide or silicon oxide is contained in an amount of 50 parts by weight or more per 100 parts by weight of wire enamel resin content in the wire enamel composition. On the other hand, in the present invention, a remarkable effect of improving partial discharge deterioration-resistance is exerted even if the amount of a metal oxide fine particle or silicon oxide fine particle is 3 parts by weight. The reason for this is that by dispersing metal oxide fine particle sol or silicon oxide fine particle sol into a wire enamel composition, a partial discharge-resistant wire enamel composition manifesting uniform dispersibility is obtained, and by coating this partial discharge-resistant wire enamel composition on a conductor, a partial discharge-resistant enameled wire having both excellent extension and partial discharge deterioration-resistance can be obtained.

Accordingly, a partial discharge-resistant magnet wire of the present invention shows excellent various properties such as appearance, close adherence, flexibility and the like in addition to excellent extension and partial discharge deterioration-resistance. For this reason, in a partial discharge-resistant magnet wire of the present invention, an under coating layer or over coating layer becomes dispensable of course, an under coating layer or over coating layer can be provided, if necessary, under or over a partial discharge-resistant wire enamel composition coating layer of the present invention.

Further, in a partial discharge-resistant magnet wire of the present invention, if necessary, a self lubricating coating layer may also be provided as an outermost layer.

EXAMPLE

Examples of a partial discharge-resistant wire enamel composition and a partial discharge-resistant magnet wire of the present invention together with comparative example will be explained below.

Example 1

Silica sol (dispersing medium: xylene/butanol, average particle size of silica: 12 nm) was added to a tris-(hydroxyethyl isocyanurate)-modified polyester imide wire enamel composition, and mixed by stirring to obtain a partial discharge-resistant wire enamel composition containing 20 parts by weight of the silica fine particle per 100 parts by weight of wire enamel resin.

The resultant partial discharge-resistant wire enamel composition was, then, applied on a copper conductor having a diameter of 1.0 mm by seven times coating and baking to obtain 35 μm thickness of a silica fine particle sol-dispersed wire enamel composition coating layer.

Figure 3:
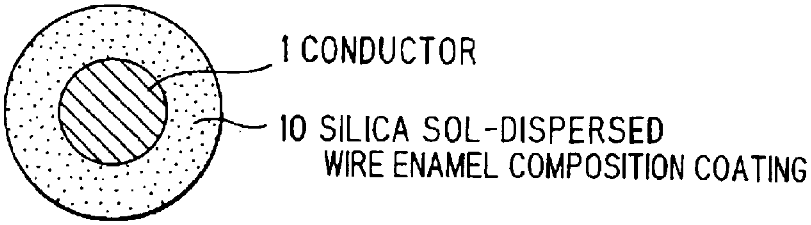
FIG. 3 is a sectional view of a partial discharge-resistant enameled wire of example 1.

FIG. 3 shows a sectional view of the partial discharge-resistant magnet wire of example 1 thus obtained. In FIG. 3, 1 represents the conductor, and 10 represents the fine particle sol-dispersed wire enamel composition coating layer.

Example 2

Silica sol (dispersing medium: xylene/butanol, average particle size of silica: 12 nm) was added to a tris-(hydroxyethyl isocyanurate)-modified polyester imide wire enamel composition, and mixed by stirring to obtain a partial discharge-resistant wire enamel composition containing 60 parts by weight of the silica fine particle per 100 parts by weight of wire enamel resin.

The resulted partial discharge-resistant was wire enamel composition, then, applied on a copper conductor having a diameter of 1.0 mm by seven times coating and baking to obtain 35 μm thickness of a silica fine particle sol-dispersed wire enamel composition coating layer.

Example 3

Silica sol (dispersing medium: xylene/butanol, average particle size of silica: 12 nm) was added to a tris-(hydroxyethyl isocyanurate)-modified polyester imide wire enamel composition, and mixed by stirring to obtain a partial discharge-resistant wire enamel composition containing 30 parts by weight of the silica fine particle per 100 parts by weight of wire enamel resin.

The resulted partial discharge-resistant wire enamel composition was, then, applied on a copper conductor having a diameter of 1.0 mm by seven times coating and baking to obtain 32 μm thickness of a silica fine particle sol-dispersed wire enamel composition coating layer.

Further, a lubricant polyamideimide wire enamel composition (HI-406SL manufactured by Hitachi Chemical Co. Ltd.) was applied over the partial discharge-resistant wire enamel composition coating layer by coating and baking to obtain 3 μm thickness of a self lubricating coating layer.

Figure 4:
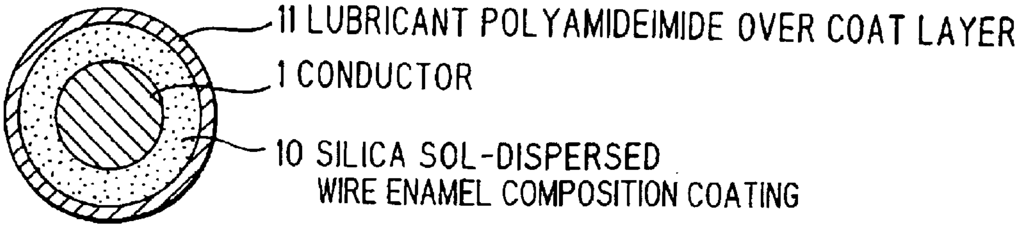
FIG. 4 is a sectional view of a lubricant polyamideimide-overcoated partial discharge-resistant magnet wire of example 3.

FIG. 4 shows a sectional view of the lubricant partial discharge-resistant magnet wire of example 3. In FIG. 4, 1 represents the conductor, 10 represents the silica sol-dispersed wire enamel composition coating layer, and 11 represents the lubricant polyamideimide over coat layer.

Example 4

Silica sol (dispersing medium; dimethylacetamide, average particle size of silica: 30 nm) was added to a polyamideimide wire enamel composition, and mixed by stirring to obtain a partial discharge-resistant wire enamel composition containing 40 parts by weight of the silica fine particle per 100 parts by weight of wire enamel resin.

The resultant partial discharge-resistant wire enamel composition was, then, applied on a copper conductor having a diameter of 1.0 mm by seven times coating and baking to obtain 35 μm thickness of a silica fine particle sol-dispersed wire enamel composition coating layer.

Example 5

Silica sol (dispersing medium: dimethylacetamide, average particle size of silica: 30 nm) was added to a polyimide wire enamel composition, and mixed by stirring to obtain a partial discharge-resistant wire enamel composition containing 40 parts by weight of the silica fine particle per 100 parts by weight of wire enamel resin.

The resultant partial discharge-resistant wire enamel composition was, then, applied on a copper conductor having a diameter of 1.0 mm by seven times coating and baking to obtain 35 μm thickness of a silica fine particle sol-dispersed wire enamel composition coating layer.

Example 6

Zirconia sol (dispersing medium: water, average particle size of zirconia: 70 nm) was added to a polyimide wire enamel composition, and mixed by stirring to obtain a partial discharge-resistant wire enamel composition containing 40 parts by weight of the silica fine particle per 100 parts by weight of wire enamel resin.

The resultant partial discharge-resistant wire enamel composition was, then, applied on a copper conductor having a conductor diameter of 1.0 mm by seven times coating and baking to obtain 35 μm thickness of a metal oxide fine particle sol-dispersed wire enamel composition coating layer.

Example 7

Alumina sol (dispersing medium: water, average particle size of alumina: 10 to 20 nm) was added to a polyimide wire enamel composition, and mixed by stirring to obtain a partial discharge-resistant wire enamel composition containing 40 parts by weight of the silica fine particle per 100 parts by weight of wire enamel resin.

The resultant partial discharge-resistant wire enamel composition was, then, applied on a copper conductor having a diameter of 1.0 mm by seven times coating and baking to obtain 35 μm thickness of a metal oxide fine particle sol-dispersed wire enamel composition coating layer.

Example 8

A polyamideimide wire enamel composition was applied on a copper wire having diameter of 1.0 mm by four times coating and baking to obtain the 20 μm the thickness of a polyamideimide wire enamel composition coating layer.

Silica sol (dispersing medium: dimethylacetamide, average particle size of alumina: 12 nm) was added to a polyimide wire enamel composition, and mixed by stirring to obtain a partial discharge-resistant wire enamel composition containing 40 parts by weight of the silica fine particle per 100 parts by weight of wire enamel resin.

The resultant partial discharge-resistant wire enamel composition was, then, applied on the polyamideimide wire enamel composition coating layer by twice coating and baking to obtain 10 μm thickness of a silica fine particle sol-dispersed wire enamel composition coating layer.

Further, a polyamideimide wire enamel composition was applied over the silica fine particle sol-dispersed wire enamel composition coating layer by coating and baking to obtain 5 μm thickness of a polyamideimide wire enamel composition coating layer.

This partial discharge-resistant magnet wire of example 8 is three-layer structure magnet wire having a polyamideimide undercoat layer, a partial discharge-resistant intermediate layer and a polyamideimide overcoat layer.

Comparative Example 1

Silica sol (dispersing medium: xylene/butanol, average particle size of silica: 12 nm) was added to a tris-(hydroxyethyl isocyanurate)-modified polyester imide wire enamel composition, and mixed by stirring to obtain a partial discharge-resistant wire enamel composition containing 2 parts by weight of the silica fine particle per 100 parts by weight of wire enamel resin.

The resultant partial discharge-resistant wire enamel composition was, then, applied on a copper conductor having a diameter of 1.0 mm by seven times coating and baking to obtain 35 μm thickness of a silica fine particle sol-dispersed wire enamel composition coating layer.

Comparative Example 2

Silica sol was added to a tris-(hydroxyethyl isocyanurate)-modified polyester imide wire enamel composition, and mixed by stirring to obtain a partial discharge-resistant wire enamel composition containing 120 parts by weight of the silica fine particle per 100 parts by weight of wire enamel resin.

The resultant partial discharge-resistant wire enamel composition was, then, applied on a copper conductor having a diameter of 1.0 mm by seven times coating and baking to obtain 35 μm thickness of a metal oxide fine particle sol-dispersed wire enamel composition coating layer.

Comparative Example 3

A tris-(hydroxyethyl isocyanurate)-modified polyesterimide wire enamel composition was applied on a copper conductor having diameter of 1.0 mm by four times coating and baking to obtain 20 μm thickness of a polyesterimide wire enamel composition layer.

65 parts by weight of silica fine particle (not in the form of sol, average particle size: 50 nm) was added to 100 parts by weight of tris-(hydroxyethyl isocyanurate)-modified polyesterimide wire enamel composition and mixed by stirring to obtain a partial discharge-resistant wire enamel composition.

The resultant partial discharge-resistant wire enamel composition was applied on the polyesterimide wire enamel composition coating layer by twice coating and baking to obtain a 10 μm thickness silica fine particle-dispersed wire enamel composition layer.

Further, a polyamideimide wire enamel composition was applied on the silica fine particle dispersed wire enamel composition coating layer to obtain 5 μm thickness of a polyamideimide wire enamel composition coating layer.

This partial discharge-resistant magnet wire of comparative example 3 is a three-layer structure magnet wire having a polyesterimide undercoat layer, a partial discharge-resistant intermediate layer and a polyamideimide overcoat layer.

Comparative Example 4

A tris-(hydroxyethyl isocyanurate)-modified polyesterimide wire enamel composition was applied on a copper conductor having, diameter of 1.0 mm by seven times coating and baking to obtain 35 μm thickness of a polyesterimide wire enamel composition coating layer.

Comparative Example 5

A polyamideimide wire enamel composition was applied on a copper conductor having diameter of 1.0 mm by seven times coating and baking to obtain 35 μm thickness of a polyamideimide wire enamel composition coating layer.

Structures and properties of magnet wires of the examples and comparative examples are shown in Tables 1 to 5. The test of general properties of the magnet wire was conducted according to JIS-C3003. The partial discharge-resistance was evaluated by subjecting sample magnet wires themselves to V-t property test under normal condition (voltage-partial discharge life time property test), V-t property test after 10% extension (voltage-partial discharge life time property test), and V-t property test after 20% extension (voltage-partial discharge life time property test). In Tables 1 to 5, tris-(hydroxyethyl isocyanurate) is abbreviated as THEIC.

TABLE 1

| | | | Example 1 | Example 2 | Example 3 |
|---|---|---|---|---|---|
| Wire enamel composition | THEIC-modified polyesterimide resin | | 100 | 100 | 100 |
| | Polyamideimide resin | | — | — | — |
| | Polyimide resin | | — | — | — |
| | Silica sol (Silica content) | | 20 | 60 | 30 |
| | Zirconia sol (Zirconia content) | | — | — | — |
| | Alumina sol (Alumina content) | | — | — | — |
| | Silica fine particle | | — | — | — |
| Structure of magnet wire | Under coat layer | | Silica-containing THEIC-modified polyesterimide | Silica-containing THEIC-modified polyesterimide | Silica-containing THEIC-modified polyesterimide |
| | Intermediate layer | | — | — | — |
| | Over coat layer | | — | — | Lubricant polyamideimide |
| Property of magnet wire | Dimension (mm) | Conductor diameter | 1.000 | 0.999 | 1.000 |
| | | Under coat layer thickness | 0.035 | 0.036 | 0.032 |
| | | Intermediate layer thickness | — | — | — |
| | | Over coat layer thickness | — | — | 0.003 |
| | | Overall diameter | 1.070 | 1.069 | 1.070 |
| | Appearance | | Transparent EIW color | Transparent EIW color | Transparent EIW color |
| | Flexibility (20% elongation winding) | | 1d | 1d | 1d |
| | Sliding property (static friction coefficient) | | 0.11 | 0.09 | 0.05 |
| | Coating hardness (pencil method) | | 7H | 8H | 7H |
| | Dielectric breakdown voltage (kV) | Normal condition | 16.0 | 15.6 | 15.8 |
| | | 10% elongation | 15.6 | 15.0 | 15.5 |
| | | 20% elongation | 15.0 | 15.0 | 14.6 |

TABLE 1-continued

| | | | Example 1 | Example 2 | Example 3 |
|---|---|---|---|---|---|
| | V-t property (h) 10 kHz–1.5 kV sine wave | Normal condition | 42.7 | 65.2 | 41.0 |
| | | 10% elongation | 38.6 | 28.2 | 39.0 |
| | | 20% elongation | 11.3 | 5.8 | 9.1 |

TABLE 2

| | | | Example 4 | Example 5 | Example 6 |
|---|---|---|---|---|---|
| Wire enamel composition | THEIC-modified polyesterimide resin | | — | — | — |
| | Polyamideimide resin | | 100 | — | — |
| | Polyimide resin | | — | 100 | 100 |
| | Silica sol (Silica content) | | 40 | 40 | — |
| | Zirconia sol (Zirconia content) | | — | — | 40 |
| | Alumina sol (Alumina content) | | — | — | — |
| | Silica fine particle | | — | — | — |
| Structure of magnet wire | Under coat layer | | Silica-containing polyamideimide | Silica-containing polyimide | Zirconia-containing polyimide |
| | Intermediate layer | | — | — | — |
| | Over coat layer | | — | — | — |
| Property of magnet wire | Dimension (mm) | Conductor diameter | 1.000 | 1.000 | 0.999 |
| | | Undercoat layer thickness | 0.035 | 0.035 | 0.035 |
| | | Intermediate layer thickness | — | — | — |
| | | | — | — | — |
| | | Overcoat layer thickness | — | — | — |
| | | Overall diameter | 1.070 | 1.069 | 1.069 |
| | Appearance | | Transparent EIW color | Transparent PIW color | Semitransparent opalescent PIW color |
| | Flexibility (20% elongation winding) | | 1d | 1d | 1d |
| | Sliding property (static friction coefficient) | | 0.10 | 0.10 | 0.11 |
| | Coating hardness (pencil method) | | 8H | 7H | 7H |
| | Dielectric breakdown voltage (kV) | Normal condition | 16.8 | 16.0 | 14.8 |
| | | 10% elongation | 16.5 | 15.5 | 13.8 |
| | | 20% elongation | 15.6 | 15.5 | 13.8 |
| | V-t property (h) 10 kHz–1.5 kV sine wave | Normal condition | 42.0 | 52.1 | 48.0 |
| | | 10% elongation | 40.0 | 36.9 | 40.5 |
| | | 20% elongation | 10.1 | 12.6 | 6.9 |

TABLE 3

| | | Example 7 | Example 8 |
|---|---|---|---|
| Wire enamel composition | THEIC-modified polyesterimide resin | — | — |
| | Polyamideimide resin | — | 100 |
| | Polyimide resin | 100 | — |
| | Silica sol (Silica content) | — | — |
| | Zirconia sol (Zirconia content) | 40 | — |
| | Alumina sol (Alumina content) | — | 40 |
| | Silica fine particle | — | — |
| Structure of magnet wire | Under coat layer | Alumina-containing polyimide | Polyamideimide |
| | Intermediate layer | — | Silica-containing polyamideimide |
| | Over coat layer | — | Polyamideimide |

TABLE 3-continued

| | | | Example 7 | Example 8 |
|---|---|---|---|---|
| Property of magnet wire | Dimension (mm) | Conductor diameter | 0.999 | 1.000 |
| | | Undercoat layer thickness | 0.035 | 0.020 |
| | | Intermediate layer thickness | — | 0.010 |
| | | Over coat layer thickness | — | 0.005 |
| | | Overall diameter | 1.069 | 1.070 |
| | Appearance | | Semitransparent opalescent PIW color | Transparent AIW color |
| | Flexibilty (20% elongation winding) | | 1d | 1d |
| | Sliding property (static friction coefficient) | | 0.11 | 0.14 |
| | Coating hardness (pencil method) | | 7H | 7H |
| | Dielectric breakdown voltage (kV) | Normal condition | 14.6 | 16.2 |
| | | 10% elongation | 14.4 | 15.9 |
| | | 20% elongation | 14.2 | 15.5 |
| | V-t property (h) 10 kHz–1.5 kV sine wave | Normal condition | 44.5 | 16.7 |
| | | 10% elongation | 38.0 | 14.2 |
| | | 20% elognation | 15.0 | 9.5 |

TABLE 4

| | | | comparative example 1 | comparative example 2 |
|---|---|---|---|---|
| Wire enamel composition | THEIC-modified polyesterimide resin | | 100 | 100 |
| | Polyamideimide resin | | — | — |
| | Polyimide resin | | — | — |
| | Silica sol (Silica content) | | 2 | 120 |
| | Zirconia sol (Zirconia content) | | — | — |
| | Alumina sol (Alumina content) | | — | — |
| | Silica fine particle | | — | — |
| Structure of magnet wire | Under coat layer | | Silica-containing THEIC-modified polyesterimide | Silica-containing THEIC-modified polyesterimide |
| | Intermediate layer | | — | — |
| | Over coat layer | | — | — |
| Property of magnet wire | Dimension (mm) | Conductor diameter | 1.000 | 1.000 |
| | | Undercoat layer thickness | 0.035 | 0.035 |
| | | Intermediate layer thickness | — | — |
| | | Over coat layer thickness | — | — |
| | | Overall diameter | 1.070 | 1.070 |
| | Appearance | | Transparent EIW color | Transparent EIW color |
| | Flexibility (20 % elongation winding) | | 1d | 3d |
| | Sliding property (static friction coefficient) | | 0.13 | 0.09 |
| | Coating hardness (pencil method) | | 6H | 9H |
| | Dielectric breakdown voltage (kV) | Normal condition | 16.3 | 15.4 |
| | | 10% elongation | 16.1 | 15.0 |
| | | 20% elongation | 15.6 | 14.9 |
| | V-t property (h) 10 kHz–1.5 kV sine wave | Normal condition | 1.5 | 63.5 |
| | | 10% elongation | 1.3 | 2.9 |
| | | 20% elongation | 1.0 | 0.13 |
| | | | 1.0 | 0.13 |

TABLE 5

| | | | comparative example 3 | comparative example 4 | comparative example 5 |
|---|---|---|---|---|---|
| Wire enamel composition | THEIC-modified polyesterimide resin | | 100 | 100 | 100 |
| | Polyamideimide resin | | — | — | 100 |
| | Polyimide resin | | — | — | — |
| | Silica sol (Silica content) | | | | |
| | Zirconia sol (Zirconia content) | | — | — | — |
| | Alumina sol (Alumina content) | | — | — | — |
| | Silica fine particle | | 65 | — | — |
| Structure of magnet wire | Under coat layer | | THEIC-modified polyesterimide | THEIC-modified polyesterimide | Polyamideimide |
| | Intermediate layer | | Silica fine powder-containing polyesterimide | — | — |
| | Over coat layer | | — | — | — |
| Property of magnet wire | Dimension (mm) | Conductor diameter | 1.000 | 1.000 | 0.999 |
| | | Undercoat layer thickness | 0.020 | 0.035 | 0.035 |
| | | Intermediate layer thickness | 0.010 | — | — |
| | | Over coat layer thickness | 0.005 | — | 0.003 |
| | | Overall diameter | 1.070 | 1.070 | 1.069 |
| | Appearance | | Whitened | Transparent EIW color | Transparent AIW color |
| | Flexibilty (20% elongation winding) | | 2d (Crack in intermediate layer) | 1d | 1d |
| | Sliding property (static friction coefficient) | | 0.14 | 0.14 | 0.13 |
| | Coating hardness (pencil method) | | 6H | 5H | 6H |
| | Dielectric breakdown voltage (kV) | Normal condition | 12.5 | 16.0 | 16.7 |
| | | 10% elongation | 10.0 | 15.8 | 16.7 |
| | | 20% elongation | 7.1 | 15.7 | 16.5 |
| | V-t property (h) 10 kHz–1.5 kV sine wave | Normal condition | 5.8 | 0.33 | 0.18 |
| | | 10% elongation | 0.20 | 0.30 | 0.17 |
| | | 20% elongation | 0.10 | 0.28 | 0.17 |

As is known from Tables 1 to 5, in the partial discharge-resistant magnet wire of comparative example 1 in which silica sol was dispersed only in amount of 2 parts by weight of the silica content. The v-t properties (the partial discharge-resistant) under normal condition and after extension are as extremely poor as 1.0 to 1.5 hours.

In the partial discharge-resistant magnet wire of comparative example 2 in which silica sol was dispersed in amount of 120 parts by weight of the silica content, the partial discharge-resistant under normal condition is excellent, however, the partial discharge-resistant after extension is as extremely poor as 0.13 to 2.9 hours.

In the partial discharge-resistant magnet wire of conventional type in comparative example 3, the partial discharge-resistant after extension is as extremely poor as 0.10 to 0.20 hours. In the polyesterimide magnet wire in comparative example 4, the partial discharge-resistant after extension is as extremely poor as 0.28 to 0.30 hours. In the polyamide-imide magnet wire in comparative example 5, the partial discharge-resistant under normal condition and after extension are as extremely poor as 0.17 to 0.18 hours.

However, in the partial discharge-resistant enameled wires in Examples 1 to 8, general various properties such as appearance, flexibility, coating hardness, dielectric breakage voltage and the like are excellent, and excellent extension-resistance and excellent partial discharge deterioration-resistance are satisfied simultaneously.

A partial discharge-resistant wire enamel composition of the present invention has excellent uniform dispersibility and transparency, consequently, if a partial discharge-resistant wire enamel composition the present invention is coated and baked on a conductive wire, a partial discharge-resistant magnet wire having excellent extension-resistance and excellent partial discharge deterioration-resistance simultaneously can be obtained. Thus obtained partial discharge-resistant enameled wire of the present invention is excellent also in general various properties such as appearance, flexibility, film hardness, dielectric breakage voltage and the like, and is useful industrially.

What is claimed is:

1. A partial discharge-resistant wire enamel composition wherein at least one fine particle sol selected from the group of metal oxide fine particle sol and silicon oxide fine particle sol is dispersed, said wire enamel composition comprising 100 parts by weight of wire enamel resin and 3 to 100 parts by weight of at least one fine particle selected from a metal oxide fine particle and a silicon oxide fine particle and each of the metal oxide fine particle sol and silicon oxide fine particle sol is transparent or opalescent colloid liquid containing a metal oxide fine particle or silicon oxide fine particle having an average particle size of 100 nm ($100\times10^{-6}$ mm) or less in a dispersing medium having excellent compatibility with a wire enamel composition.

2. A partial discharge-resistant magnet wire obtained by coating and baking directly or through other coating layer on a conductor, a wire enamel composition wherein at least one fine particle sol selected from the group of metal oxide fine particle sol and silicon oxide fine particle sol is dispersed, said wire enamel composition comprising 100 parts by weight of wire enamel resin and 3 to 100 parts by weight of at least one fine particle selected from the group of a metal oxide fine particle and a silicon oxide fine particle and each of the metal oxide fine particle sol and silicon oxide fine particle sol is transparent or opalescent colloid liquid containing a metal oxide fine particle or silicon oxide fine particle having an average particle size of 100 nm ($100\times10^{-6}$ mm) or less in a dispersing medium having excellent compatibility with a wire enamel composition.

3. A partial discharge-resistant enameled wire obtained by providing a lubricant coating layer on the outer circumference or a coating layer produced by coating and baking directly or through other coating layer on a conductor a wire enamel composition wherein at least one fine particle sol selected from the group of metal oxide fine particle sol and silicon oxide fine particle sol is dispersed and each of the metal oxide fine particle sol and silicon oxide fine particle sol is transparent or opalescent colloid liquid containing a metal oxide fine particle or silicon oxide fine particle having an average particle size of 100 nm ($100\times10^{-6}$ mm) or less in a dispersing medium having excellent compatibility with a wire enamel composition.

4. A partial discharge-resistant wire enamel composition in which at least one of a metal oxide fine particle sol and a silicon oxide fine particle sol is dispersed, comprising:

100 parts by weight of wire enamel resin; and 3 to 100 parts by weight of at least one of a metal oxide fine particle and a silicon oxide fine particle;

wherein the at least one sol is a transparent or opalescent colloid liquid containing one of the metal oxide fine particle or the silicon oxide fine particle having an average particle size of 100 nm ($100\times10^{-6}$ mm) or less.

5. The partial discharge-resistant wire enamel composition of claim 4, wherein the at least one sol is a transparent or opalescent colloid liquid containing one of the metal oxide fine particle or the silicon oxide fine particle in a dispersing medium having excellent compatibility with the wire enamel composition.

6. The partial discharge-resistant wire enamel composition of claim 5, wherein the dispersing medium is one of a) water, b) methanol, c) dimethylacetamide, d) methyl ethyl isobutyl ketone, or e) a xylene/butanol mixed solvent.

7. The partial discharge-resistant wire enamel composition of claim 4, wherein the at least one of the metal oxide fine particle and the silicon oxide fine particle is uniformly distributed throughout the composition.

8. The partial discharge-resistant wire enamel composition of claim 4, wherein the metal oxide fine particle sol is one of a) an alumina fine particle sol, b) a zirconia fine particle sol, c) a titania fine particle sol, or d) a yttria fine particle sol.

9. The partial discharge-resistant wire enamel composition of claim 4, wherein the silicon oxide fine particle sol is a silica fine particle sol.

10. A partial discharge-resistant wire, comprising:

a conductor; and an enamel composition formed around the conductor, the enamel composition having dispersed therein at least one of a metal oxide fine particle sol and a silicon oxide fine particle sol, the at least one sol being a transparent or opalescent colloid liquid containing one of a metal oxide fine particle or a silicon oxide fine particle having an average particle size of 100 nm ($100\times10^{-6}$ mm) or less.

11. The partial discharge-resistant wire of claim 10, wherein:

the partial discharge-resistant wire is a magnet wire; and the enamel composition includes 100 parts by weight of wire enamel resin and 3 to 100 parts by weight of at least one of the metal oxide fine particle and the silicon oxide fine particle.

12. The partial discharge-resistant wire of claim 10, further comprising:

a lubricant coating formed around the enamel composition.

13. The partial discharge-resistant wire of claim 10, wherein the at least one sol is a transparent or opalescent colloid liquid containing one of the metal oxide fine particle or the silicon oxide fine particle in a dispersing medium having excellent compatibility with the wire enamel composition.

14. The partial discharge-resistant magnet wire of claim 13, wherein the dispersing medium is one of a) water, b) methanol, c) dimethylacetamide, d) methyl ethyl isobutyl ketone, or e) a xylene/butanol mixed solvent.

15. The partial discharge-resistant wire of claim 10, wherein at least one of the metal oxide fine particle and the silicon oxide fine particle is uniformly distributed throughout the composition.

16. The partial discharge-resistant wire of claim 10, wherein the metal oxide fine particle sol is one of a) an alumina fine particle sol, b) a zirconia fine particle sol, c) a titania fine particle sol, or d) a yttria fine particle sol.

17. The partial discharge-resistant wire of claim 10, wherein the silicon oxide fine particle sol is a silica fine particle sol.

* * * * *